(12) United States Patent
Mueller

(10) Patent No.: US 8,589,047 B2
(45) Date of Patent: Nov. 19, 2013

(54) METHOD AND CONTROL DEVICE FOR OPERATING A COMBUSTION ENGINE OF A MOTOR VEHICLE AND MOTOR VEHICLE

(75) Inventor: Torsten Mueller, Russelsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 209 days.

(21) Appl. No.: 13/197,916

(22) Filed: Aug. 4, 2011

(65) Prior Publication Data
US 2012/0035822 A1 Feb. 9, 2012

(30) Foreign Application Priority Data
Aug. 5, 2010 (DE) .................. 10 2010 033 516

(51) Int. Cl.
*F02D 28/00* (2006.01)
(52) U.S. Cl.
USPC ............. 701/70; 701/82; 701/83; 701/84; 701/85; 701/78
(58) Field of Classification Search
USPC ............. 701/36, 70, 78, 82, 83, 84, 85, 101, 701/103, 104, 110
See application file for complete search history.

(56) References Cited

U.S. PATENT DOCUMENTS

| | | | |
|---|---|---|---|
| 6,223,717 B1 | 5/2001 | Wiemers | |
| 6,651,621 B2 * | 11/2003 | Farmer et al. | 123/396 |
| 7,377,256 B2 * | 5/2008 | Glora | 123/325 |

FOREIGN PATENT DOCUMENTS

| | | |
|---|---|---|
| DE | 19908408 A1 | 8/2000 |
| DE | 10035511 A1 | 1/2002 |
| DE | 10151964 A1 | 5/2003 |

OTHER PUBLICATIONS

German Patent Office, German Search Report for Application No. 10200033516.9, dated Jun. 8, 2011.
Winterhagen, J., "Genfer Salon: Verbrennungsmotoren wieder en vogue," ATZ online, Mar. 4, 2009.

* cited by examiner

*Primary Examiner* — Richard Camby
(74) *Attorney, Agent, or Firm* — Ingrassia Fisher & Lorenz, P.C.

(57) ABSTRACT

A method is provided for operating a combustion engine of a motor vehicle during a deceleration of the combustion engine. The method includes, but is not limited to determining a degree of depression of an accelerator pedal of the motor vehicle takes place, determining of a degree of depression of a brake pedal of the motor vehicle takes place. Furthermore, an adjusting of a throttle valve arranged in an intake tract of the combustion engine as a function of the determined degree of depression of the accelerator pedal and as a function of the determined degree of depression of the brake pedal takes place. The throttle valve is adjusted into an at least partially opened position in the event that the determined degree of depression of the brake pedal undershoots a first predetermined threshold value and the throttle valve is adjusted into a closed position in the event that the determined degree of depression of the brake pedal exceeds a second predetermined threshold value.

20 Claims, 3 Drawing Sheets

METHOD AND CONTROL DEVICE FOR OPERATING A COMBUSTION ENGINE OF A MOTOR VEHICLE AND MOTOR VEHICLE

CROSS-REFERENCE TO RELATED APPLICATION

This application claims priority to German Patent Application No. 102010033516.9, filed Aug. 5, 2010, which is incorporated herein by reference in its entirety.

TECHNICAL FIELD

The application relates to a method for operating a combustion engine of a motor vehicle during a deceleration of the combustion engine, a control device for a motor vehicle for operating a combustion engine of the vehicle at least during a deceleration of the combustion engine, a motor vehicle with a control device, a computer program and a computer-readable medium.

BACKGROUND

From DE 199 08 408 A1 a method and a control unit for operating a combustion engine particularly of a motor vehicle with a combustion chamber, into which fuel is directly injected and combusted in a homogenous or stratified charging mode, and with a vacuum storage unit connected to an intake pipe which provides the auxiliary energy required for the servo devices of the motor vehicle is known. There, it is provided that during the stratified charging operation of the combustion engine a choke provided on the intake pipe is adjusted in such a manner that the pressure in the intake pipe is reduced in the event that injection is cut-off particularly because of an overrun cut-off or a pressure loading of the vacuum storage unit through at least one servo device.

At least one object is to state a method for operating a combustion engine of a motor vehicle during a deceleration of the combustion engine, a control device for a motor vehicle for operating a combustion engine of the motor vehicle at least during a deceleration of the combustion engine, a motor vehicle with a control device, a computer program and a computer-readable medium which are suitable for use in conjunction with energy saving concepts of the combustion engine and thereby also provide a sufficient vacuum for a brake booster of the motor vehicle.

SUMMARY

A method for is provided for operating a combustion engine of a motor vehicle during a deceleration of the combustion engine comprises the following steps according to an aspect of the application. A determining of a degree of depression of an accelerator pedal of the motor vehicle takes place, wherein the degree of depression of the accelerator pedal characterizes how far the accelerator pedal is depressed. In addition, a determining of a degree of depression of a brake pedal of the motor vehicle takes place, wherein the degree of depression of the brake pedal characterizes how far the brake pedal is depressed. In addition to this, an adjusting of a throttle valve arranged in an intake tract of the combustion engine takes place particularly as a function of the determined degree of depression of the accelerator pedal and as a function of the determined degree of depression of the brake pedal. There, the throttle valve is adjusted into an at least partially opened position in the event that the determined degree of depression of the brake pedal reaches or undershoots a first predetermined threshold value, and wherein the throttle valve is adjusted into a closed position, in the event that the determined degree of depression of the brake pedal exceeds a second predetermined threshold value.

The method for operating the combustion engine during a deceleration of the combustion engine according to the application makes possible a use in conjunction with energy saving concepts of the combustion engine in that the throttle valve is adjusted into an at least partially opened position in the event that the determined degree of depression of the brake pedal undershoots a first predetermined threshold value, and in that the throttle valve is adjusted into a closed position in the event that the determined degree of depression of the brake pedal exceeds a second predetermined threshold value, wherein in addition a sufficiently large engine braking torque and/or a sufficient vacuum for a brake booster of the motor vehicle are provided.

The method according to the application starts out from the consideration that control concepts for motor vehicle combustion engines increasingly provide energy or $CO_2$ saving concepts, wherein during deceleration of the combustion engine as much as possible of the kinetic energy of the motor vehicle is converted into other energy forms. With these concepts it is not required or even undesirable that the combustion engine during deceleration generates a high braking force since the kinetic energy of the motor vehicle is to be preferably utilized otherwise. However, it is required for a reliable operation of the motor vehicle that for a brake booster of the motor vehicle an adequate vacuum is provided in order to make possible a satisfactory operation of the brake booster. In the method according to the application this is achieved in that the throttle valve is adjusted into a closed position in the event that the determined degree of depression of the brake pedal exceeds the second predetermined threshold value. Because of this, the required vacuum for the brake booster and a maximum braking torque of the combustion engine and thus altogether a maximum braking effect can be advantageously achieved in braking situations of the motor vehicle, whereas the throttle valve is adjusted into an at least partially opened position in the event that the determined degree of depression of the brake pedal undershoots the first predetermined threshold value. This makes possible in both cases utilizing as much as possible of the kinetic energy of the motor vehicle elsewhere, which in an advantageous manner leads to a reduction of the fuel consumption and thus a reduction of exhaust gases, particularly $CO_2$, of the combustion engine.

Preferably, the first predetermined threshold value is identical to the second predetermined threshold value. This makes possible in an advantageous manner a simple carrying-out of the method for operating the combustion engine. Furthermore, a switching-off of a fuel supply of the combustion engine during the deceleration of the combustion engine preferably takes place as well. This leads to further reduced fuel consumption and thus a further reduction of exhaust gases of the combustion engine.

In a further embodiment the determining of the degree of depression of the accelerator pedal includes a determining of an actuation of the accelerator pedal and/or the determining of the degree of depression of the brake pedal a determining of an actuation of the brake pedal. In the last-mentioned embodiment the throttle value is adjusted into the at least partially opened position in the event that the determined degree of depression of the brake pedal characterizes a non-existent actuation of the brake pedal, i.e. in the event that the degree of depression is approximately 0% of the maximum possible degree of depression or 0°, starting out from the rest position of the brake pedal, and adjusted into the closed position in the event that the determined degree of depression of the brake pedal characterizes an actuation of the brake pedal. This in turn advantageously makes possible a simple carrying-out of the method for operating the combustion engine.

In a further embodiment the throttle valve is adjusted into the at least partially opened position in such a manner that the throttle valve with the determined degree of depression of the accelerator pedal throttles a gas stream flowing through said throttle valve to a lesser degree than with non-implemented deceleration. The throttle valve is thus opened further than it would be opened outside the deceleration with the respective accelerator pedal position. Because of this, the deceleration effect of the combustion engine in this operating state is further reduced, as a result of which the kinetic energy of the motor vehicle can be employed to a greater degree for other purposes.

Particularly preferably, the throttle valve is adjusted into a largely or completely opened position, particularly into a non-throttling position in the event that the determined degree of depression of the brake pedal undershoots the first predetermined threshold value. Because of this, the throttle valve throttles the gas stream flowing through said throttle valve to the least possible degree, as a result of which the deceleration effect of the combustion engine in this operating state is minimized.

In a further preferred embodiment a conversion of kinetic energy of the motor vehicle into electric energy by means of at least one generator of the motor vehicle, particularly of a dynamo of the motor vehicle, and a storage of the electric energy in at least one energy storage device of the motor vehicle during the deceleration of the combustion engine additionally takes place.

Particularly preferably, the at least one generator in this case is designed as generator with regulated output voltage, which is also called RVC generator ("regulated voltage control generator"). This makes possible in an advantageous manner converting the kinetic energy of the motor vehicle that is available during the deceleration of the combustion engine to as high a degree as possible into electric energy in that the output voltage of the generator during the deceleration is increased and thus the charging process of the energy storage device is accelerated. Outside the deceleration of the combustion engine the output voltage of the generator can be additionally lowered or the generator completely switched off, as a result of which the combustion engine in these operating states is unloaded.

In a further configuration of the method the degree of depression of the accelerator pedal is determined by means of at least one first potentiometer or by means of at least one switch and/or the degree of depression of the brake pedal by means of at least one second potentiometer or by means of at least one switch. Because of this, the degree of depression of the corresponding pedal can be determined as accurately as possible in a simple and reliable manner. Preferably, the degree of depression of the accelerator pedal is determined by means of two potentiometers and/or the degree of depression of the brake pedal by means of two potentiometers.

The application additionally relates to a control device for a motor vehicle for operating a combustion engine of the motor vehicle at least during a deceleration of the combustion engine. The control device additionally comprises a first determination device which is designed for determining a degree of depression of an accelerator pedal of the motor vehicle, wherein the degree of depression of the accelerator pedal characterizes how far the accelerator pedal is depressed. In addition to this, the control device comprises at least one second determination device which is designed for determining a degree of depression of a brake pedal of the motor vehicle, wherein the degree of depression of the brake pedal characterizes how far the brake pedal is depressed. In addition to this, the control device comprises an adjusting device which is designed for adjusting a throttle valve arranged in an intake tract of the combustion engine. The control device is designed by means of the adjusting device to adjust the throttle valve as a function of the determined degree of depression of the accelerator pedal and as a function of the determined degree of depression of the brake pedal in such a manner that the throttle valve is adjusted into an at least partially opened position in the event that the determined degree of depression of the brake pedal reaches or undershoots a first predetermined threshold value, and in that the throttle valve is adjusted into a closed position in the event that the determined degree of depression of the brake pedal exceeds a second predetermined threshold value.

The control device according to the application has the advantages already mentioned in connection with the method according to the application, which at this point are not mentioned once more to avoid repetitions. Preferably, the first predetermined threshold value is identical to the second predetermined threshold value. In an embodiment the control device is additionally designed for switching off a fuel supply of the combustion engine during the deceleration of the combustion engine.

In a further embodiment the control device is designed by means of the adjusting device to adjust the throttle valve into the at least partially opened position in such a manner that the throttle valve throttles a gas stream flowing through said throttle valve with the determined degree of depression of the accelerator pedal to a lesser degree than with non-implemented deceleration. The control device is preferably at least partially part of a motor control device of the motor vehicle. Because of this, the control device can be at least partially integrated in an advantageous manner in components already present in the motor vehicle.

The application furthermore relates to a motor vehicle with a control device according to one of the mentioned embodiments and a generator with regulated output voltage, wherein the generator is designed for converting kinetic energy of the motor vehicle into electric energy in such a manner that during a deceleration of the combustion engine the output voltage of generator is increased.

In addition, the application relates to a computer program which, when it is executed on a computer unit of a motor vehicle, prompts the computer unit to carry out the following steps. The computer unit is prompted to carry out a determining of a degree of depression of an accelerator pedal of the motor vehicle by means of at least one first determination device, wherein the degree of depression of the accelerator pedal characterizes how far the accelerator pedal is depressed. In addition, the computer unit is prompted to carry out a determining of a degree of depression of a brake pedal of the motor vehicle by means of at least one second determination device, wherein the degree of depression of the brake pedal characterizes how far the brake pedal is depressed. In addition to this, the computer unit is prompted to carry out an adjustment of a throttle valve arranged in an intake tract of the combustion engine by means of an adjusting device as a function of the determined degree of depression of the accelerator pedal and as a function of the determined degree of depression of the brake pedal. In the process, the throttle valve during a deceleration of the combustion engine is adjusted into an at least partially opened position in the event that the determined degree of depression of the brake pedal reaches or undershoots a first predetermined threshold value, and is adjusted into a closed position in the event that the determined degree of depression of the brake pedal exceeds a second predetermined threshold value. The first predetermined threshold value is preferably identical to the second predetermined threshold value.

Furthermore, the application relates to a computer-readable medium on which a computer program according to the mentioned embodiment is stored. The motor vehicle, the computer program, which is also called electric engine control (EMS) and the computer-readable medium according to the application have the advantages already mentioned in connection with the method according to the application, which at this point are not mentioned once more to avoid repetitions. The motor vehicle in the abovementioned embodiments preferably is a passenger car.

BRIEF SUMMARY OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
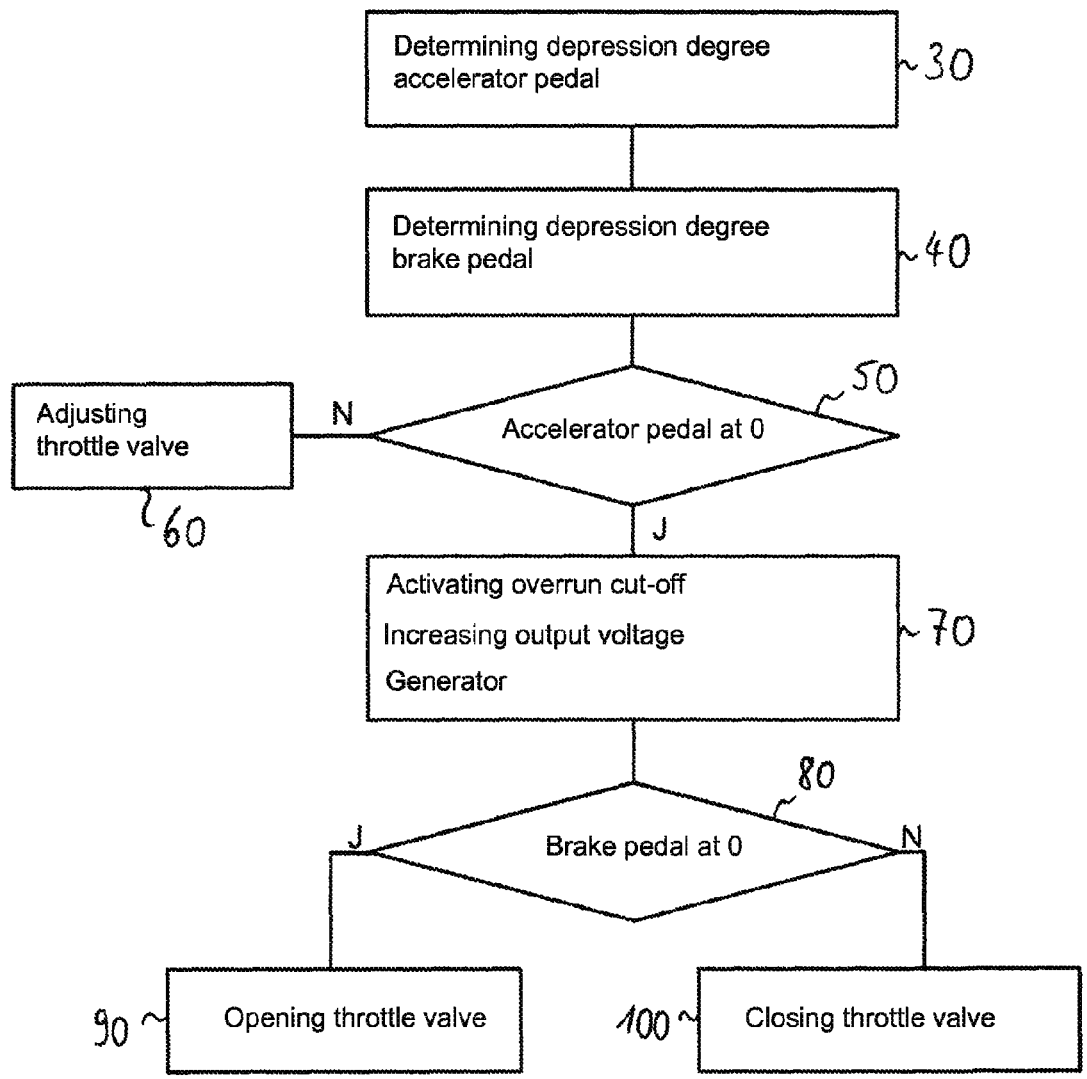
FIG. 1 shows a flow diagram of a method for operating a combustion engine according to an embodiment of the application.

FIG. 1 shows a flow diagram of a method for operating a combustion engine of a motor vehicle according to an embodiment of the application. In a step 30 a determining of a degree of depression of an accelerator pedal of the motor vehicle takes place, wherein the degree of depression of the vehicle characterizes how far the accelerator pedal is depressed. In the shown embodiment, the degree of depression of the accelerator pedal is determined by means of at least one first potentiometer.

In addition, in a step 40, a determining of a degree of depression of a brake pedal of the motor vehicle takes place, wherein the degree of depression of the brake pedal characterizes how far the brake pedal is depressed. In the shown embodiment the determining of the degree of depression of the brake pedal includes a determining of an actuation of the brake pedal, i.e. it is determined if the brake pedal is actuated or not. The steps 30 and 40 can also be carried out in reverse order, i.e., the step 40 can be carried out before the step 30.

In a step 50 it is determined if the determined degree of depression of the accelerator pedal is approximately 0% of the maximum possible degree of depression or approximately 0° based on the rest position of the accelerator pedal.

If this condition is not satisfied, an adjusting of a throttle valve arranged in an intake tract of the combustion engine takes place in a step 60 as a function of the determined degree of depression of the accelerator pedal. The position of the throttle valve to be adjusted in this case can for example be determined by means of data stored in a family of characteristics. If the abovementioned condition is satisfied, an activating of an overrun cut-off of the combustion engine preferably takes place in a step 70, i.e., the fuel supply of the combustion engine is switched off during the deceleration.

Furthermore, in the embodiment shown, kinetic energy of the motor vehicle is converted into electric energy by means of at least one generator of the motor vehicle and the electric energy stored in at least one energy storage device of the motor vehicle. Here, the at least one generator in the embodiment shown is designed as generator with regulated output voltage, wherein the output voltage with activated overrun cut-off is increased and thus a charging duration of the energy storage device is reduced.

In a step 80 it is determined if the brake pedal is not actuated. To this end it is checked if the determined degree of depression of the brake pedal amounts to approximately 0% of the maximum possible degree of depression or 0° based on the rest position of the brake pedal.

If the brake pedal is not actuated, i.e., the degree of depression of the brake pedal is approximately 0% or 0°, an adjustment of the throttle valve into a completely opened position or a largely non-throttling position takes place in the embodiment shown in a step 90. If the brake pedal is actuated, i.e. if the degree of depression is different from approximately 0% or 0°, the throttle valve is adjusted into a largely or substantially completely closed position in a step 100.

Following the step 90 or the step 100, determining of the degree of depression of the accelerator pedal and a determining of the degree of depression of the brake pedal similar to the steps 30 and 40 and a corresponding adjusting of the throttle valve in turn takes place. If in the process it is determined that the accelerator pedal is now actuated, a possible overrun cut-off of the combustion engine is terminated and the output voltage of the generator is preferably reduced.

The method according to the shown embodiment thus makes possible a reduction of the fuel consumption of the motor vehicle, wherein in addition a maximum braking effect upon an actuation of the brake pedal is made available.

Figure 2A:
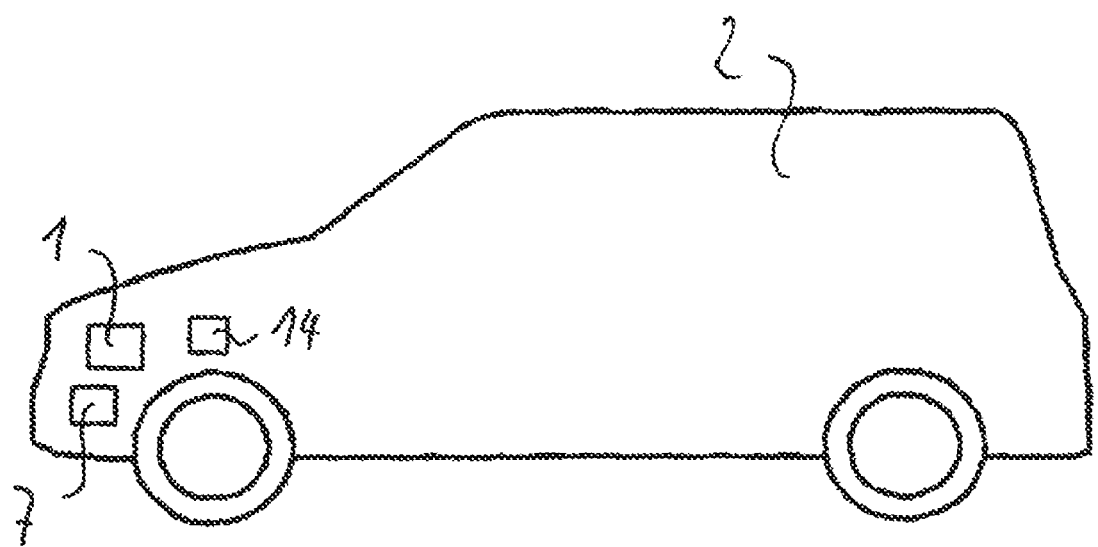
FIG. 2A shows a motor vehicle with a control device according to an embodiment of the application.
Figure 2B:
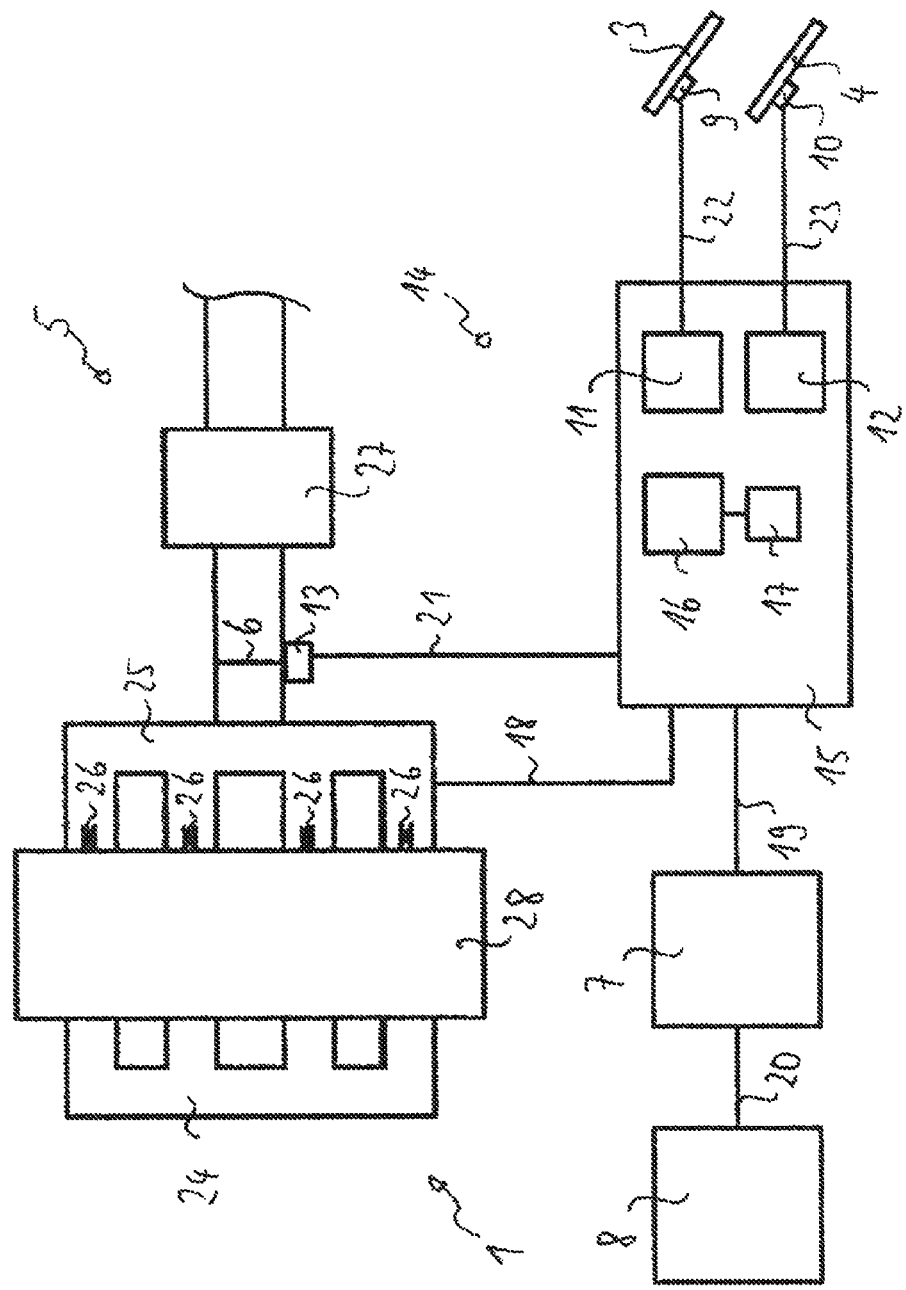
FIG. 2B shows the control device of the motor vehicle according to FIG. 2A.

FIG. 2A shows a motor vehicle 2 with a control device 14 according to an embodiment of the application. The motor vehicle 2 in the embodiment shown is a passenger car and in addition to the control device 14 has a combustion engine 1 and a generator 7 in the form of a dynamo. Further details are explained in more detail in connection with the following figure. To this end, FIG. 2B shows the combustion engine 1 and the control device 14 of the motor vehicle according to FIG. 2A. Components with the same functions as in FIG. 2A are marked with the same reference numbers.

The combustion engine 1 comprises a cylinder head 28 in which, just as in an engine block located below and not shown in FIG. 2B, combustion chambers are located. The air required for the combustion is sucked in via an intake tract 5. In the intake tract 5 an air filter 27 and a throttle valve 6 are arranged. Here, the throttle valve 6 is adjustable by means of an adjusting device 13 in form of an actuating motor. Downstream of the throttle valve 6, which is in the flow direction of the sucked-in ambient air behind the throttle valve 6, the airflow enters a suction pipe 25 which divides the air into four branches combustion chambers of the combustion engine 1. The shown embodiment thus represents a four-cylinder combustion engine, wherein the combustion engine in other embodiments can have other cylinder numbers, for example three, six or eight cylinders.

At the ends of the branches of the suction pipe 25 and just before the combustion chambers or their inlet valves which are not shown in FIG. 2B an injection valve 26 each is located in each branch, by means of which fuel can be injected so that combustion in the combustion chambers can take place. In further embodiments the injection valves are arranged in the respective combustion chambers and inject the fuel directly into the combustion chambers.

The combusted fuel-air mixture is discharged from the combustion engine 1 by means of an exhaust manifold 24. The combustion engine 1 is controlled by means of an engine control device 15. To this end, the combustion engine 1 is connected to the engine control device 15 via a control and connection line 18. In particular, the engine control device 15 controls the injection valves 26.

The control device 14 in the embodiment shown comprises a first determination device 11 which is designed for determining a degree of depression of an accelerator pedal 3 of the motor vehicle, while the degree of depression of the accelerator pedal 3 characterizes how far the accelerator pedal 3 is depressed. To this end, the first determination device 11 via a signal line 22 is connected to at least one first potentiometer 9, by means of which the degree of depression of the accelerator pedal 3 is captured. Furthermore, the control device 14 comprises a second determination device 12 which is designed for determining a degree of depression of a brake pedal 4 of the motor vehicle, wherein the degree of depression of the brake pedal 4 characterizes how far the brake pedal 4 is depressed. To this end, the second determination device 12 via a signal line 23 is connected to at least one second potentiometer 10, by means of which the degree of depression of the brake pedal 4 is captured.

The first determination device 11 and the second determination device 12 are integrated in the engine control device 15. Thus, the control device 14 in the shown embodiment is partially a constituent part of the engine control device 15.

The control device 14 is designed to adjust the throttle valve 6 by means of the adjusting device 13 as a function of the determined degree of depression of the accelerator pedal 3 and as a function of the determined degree of depression of the brake pedal 4. The adjusting device 13 to this end is connected to the control device 14 and the engine control device 15 via a control line 21. In driving mode the control device 14 controls the throttle valve 6 by means of the adjusting device 13 in such a manner that dependent on the determined degree of depression of the accelerator pedal 3 the combustion engine 1 is supplied with an air-fuel mixture resulting in a drive torque of the desired magnitude.

In the process, driving situations occur in which the accelerator pedal position is clearly reduced or the accelerator pedal 3 is not actuated, in other words is in a rest position. In the shown embodiment the engine control device 15 in the presence of these and further conditions, for example of a rotational speed above idle rotational speed, an engaged gear and an operating temperature of a catalytic converter in a desired range, activates an overrun cut-off, i.e. a cutting-off of the fuel supply of the combustion engine 1 during a deceleration of the combustion engine 1. To this end, the injection valves 26 are activated in such a manner that they no longer inject any fuel.

With overrun cut-off of the combustion engine 1 activated in such a manner and if in addition the accelerator pedal position is not changed or even reduced, the control device 14 controls the throttle valve 6 by means of the adjusting device 13 in such a manner that the throttle valve 6 is adjusted into an at least partially opened position, wherein in the shown embodiment the throttle valve 6 is adjusted in such a manner that with the determined degree of depression of the accelerator pedal 3 it throttles the gas stream flowing through said throttle valve to a lesser degree than with non-implemented deceleration. The throttle valve 6 is thus opened further than it would have been opened outside the deceleration with the respective accelerator pedal position. Preferentially, the throttle valve 6 in this operating state of the combustion engine 1 is adjusted into a completely opened position or a largely non-throttling position.

Because of this, the deceleration effect of the combustion engine 1 in this operating state is reduced so that the kinetic energy of the motor vehicle can be employed for other purposes. In the shown embodiment a converting of kinetic energy of the motor vehicle into electric energy takes place in the process by means of the generator 7 and a storing of the generated electric energy in an energy storage device 8 of the motor vehicle. The generator 7 to this end is connected in a manner not shown in more detail to the combustion engine 1, for example by way of a belt drive, and to the energy storage device 8 via a connecting line 20. In addition, the generator 7 is connected to the engine control device 15 via a connecting line 19. In the shown embodiment the generator 7 in this case is designed as generator with regulated output voltage. With activated overrun cut-off of the combustion engine 1 the output voltage of the generator 7 is increased, as a result of which the charging duration of the energy storage device 8 can be reduced. With non-activated overrun cut-off of the combustion engine 1 the output voltage of the generator 7 can be reduced or the generator 7 completely switched off if applicable, as a result of which the combustion engine 1 is unloaded in these operating states.

If however the determined degree of depression of the brake pedal 4 characterizes an actuation of the brake pedal 4 the throttle valve 6 is adjusted into a closed position. Because of this, a required vacuum for a brake booster which is not shown and additionally as large as possible a braking torque of the combustion engine 1 upon an actuation of the brake pedal 4 and thus a greatest possible braking effect can be provided. In addition, in this driving situation, the kinetic energy of the motor vehicle continues to be converted into electric energy by means of the generator 7 and the electric energy stored in the energy storage device 8.

In the shown embodiment the engine control device 15 additionally comprises a computer unit 16 and a computer-readable medium 17, wherein on the computer-readable medium 17 a computer program is stored which, when it is executed on the computer unit 16, prompts the computer unit 16 to carry out the mentioned steps of the method according to the application, particularly of the embodiment shown in FIG. 1, by means of the mentioned elements of the control device 14. To this end, the computer unit 16 is directly or indirectly connected to the mentioned components in a manner which is not shown in more detail.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for operating a combustion engine of a motor vehicle during a deceleration of the combustion engine, comprising:
   determining a degree of depression of an accelerator pedal of the motor vehicle;

determining a degree of depression of a brake pedal of the motor vehicle;

adjusting of a throttle valve arranged in an intake tract of the combustion engine as a function of the degree of depression of the accelerator pedal and as a function of the degree of depression of the brake pedal;

adjusting the throttle valve into an at least partially opened position in event that the degree of depression of the brake pedal undershoots a first predetermined threshold value; and adjusting the throttle valve into a closed position in event that the degree of depression of the brake pedal exceeds a second predetermined threshold value.

2. The method according to claim 1, further comprising cutting-off of a fuel supply of the combustion engine during the deceleration of the combustion engine.

3. The method according to claim 1, wherein the determining of the degree of depression of the accelerator pedal comprises determining of an actuation of the accelerator pedal.

4. The method according to claim 1, wherein the determining of the degree of depression of the brake pedal comprises a determining of an actuation of the brake pedal.

5. The method according to claim 1, further comprising adjusting the throttle valve in the at least partially opened position in such a manner that the throttle valve with the degree of depression of the accelerator pedal is configured to throttle a gas stream flowing through said throttle valve to a lesser degree than with non-implemented deceleration.

6. The method according to claim 1, further comprising adjusting the throttle valve into a completely opened position in event that the degree of depression of the brake pedal undershoots the first predetermined threshold value.

7. The method according to claim 1, further comprising:
converting of kinetic energy of the motor vehicle into electric energy with a generator of the motor vehicle; and
storing of the electric energy in an energy storage device of the motor vehicle.

8. The method according to claim 7, further comprising:
regulating an output voltage; and
increasing the output voltage during the deceleration of the combustion engine.

9. The method according to claim 1, further comprising determining the degree of depression of the accelerator pedal with a first potentiometer.

10. The method according to claim 9, further comprising determining the degree of depression of the brake pedal with a second potentiometer.

11. An apparatus for operating a combustion engine of a motor vehicle at least during an overrun cut-off mode of the combustion engine, comprising:
a first determination device configured to determine a degree of depression of an accelerator pedal of the motor vehicle;
a second determination device configured to determine a degree of depression of a brake pedal of the motor vehicle;
an adjusting device configured to adjust a throttle valve arranged in an intake tract of the combustion engine; and
a control device configured to adjust the throttle valve as a function of the degree of depression of the accelerator pedal and as a function of the degree of depression of the brake pedal in such a manner that the throttle valve is adjusted into an at least partially opened position in the event that the degree of depression of the brake pedal undershoots a first predetermined threshold value and in that the throttle valve is adjusted into a closed position in the event that the degree of depression of the brake pedal exceeds a second predetermined threshold value.

12. The control device according to claim 11, wherein the control device is further configured to cut off a fuel supply of the combustion engine during a deceleration of the combustion engine.

13. The control device according to claim 11, wherein the control device is further configured to adjust the throttle valve into the at least partially opened position in such a manner that the throttle valve with the degree of depression of the accelerator pedal is configured to throttle a gas stream flowing through the throttle valve to a lesser degree than with non-implemented deceleration.

14. The control device according to claim 11, wherein the control device is at least partially a constituent part of an engine control device of the motor vehicle.

15. A non-transitory computer readable medium embodying a computer program product, the program product comprising:
an operating program for operating a combustion engine of a motor vehicle during a deceleration of the combustion engine, the operating program configured to:
determine a degree of depression of an accelerator pedal of the motor vehicle;
determine a degree of depression of a brake pedal of the motor vehicle;
adjust of a throttle valve arranged in an intake tract of the combustion engine as a function of the degree of depression of the accelerator pedal and as a function of the degree of depression of the brake pedal;
adjust the throttle valve into an at least partially opened position in event that the degree of depression of the brake pedal undershoots a first predetermined threshold value; and
adjust the throttle valve into a closed position in event that the degree of depression of the brake pedal exceeds a second predetermined threshold value.

16. The non-transitory computer readable medium embodying the computer program product according to claim 15, the operating program further configured to cut-off of a fuel supply of the combustion engine during the deceleration of the combustion engine.

17. The non-transitory computer readable medium embodying the computer program product according to claim 15, wherein the operating program is configured to determine of an actuation of the accelerator pedal.

18. The non-transitory computer readable medium embodying the computer program product according to claim 15, wherein the operating program is configured to determine of an actuation of the brake pedal.

19. The non-transitory computer readable medium embodying the computer program product according to claim 15, wherein the operating program is configured to adjust the throttle valve in the at least partially opened position in such a manner that the throttle valve with the degree of depression of the accelerator pedal is configured to throttle a gas stream flowing through said throttle valve to a lesser degree than with non-implemented deceleration.

20. The non-transitory computer readable medium embodying the computer program product according to claim 15, wherein the operating program is configured adjust the throttle valve into a completely opened position in event that the degree of depression of the brake pedal undershoots the first predetermined threshold value.

* * * * *